March 18, 1941. R. M. WOHLFARTH ET AL 2,235,444

MILLING MACHINE

Filed Nov. 24, 1937

Inventors
Reinhard Max Wohlfarth
and Paul Alfred Mitter
BY
their attorney

Patented Mar. 18, 1941

2,235,444

UNITED STATES PATENT OFFICE 2,235,444

MILLING MACHINE

Reinhard Max Wohlfarth, Dresden, and Paul Alfred Mitter, Pirna-Copitz, Germany, assignors to Aktiengesellschaft vorm. Seidel & Naumann, Dresden, Germany Application November 24, 1937, Serial No. 176,172 In Germany November 30, 1936

4 Claims. (Cl. 90—58)

This invention comprises improvements in or relating to milling machines and has more particular reference to that kind of machine having a horizontal arbor for the milling cutter and a vertically adjustable worktable.

Heretofore it has been customary to accommodate the worktable on a part such as an angle bracket or knee projecting from the upstanding column or frame of the machine and guided thereon for enabling the height of the table to be adjusted.

As is well known, during milling operations considerable vertical pressures, amongst others, are transmitted to the worktable and these pressures in machines as heretofore constructed produce considerable tilting moments at the guides on the column or frame.

The present invention has amongst its objects to provide an improved mounting or support for the worktable and a guide for the vertical movement thereof, whereby the aforesaid tilting moments are effectively eliminated, and vertical and other pressures more effectively absorbed during the milling operations, and also whereby the vertical adjustment of the worktable is more easily effected than heretofore.

With this and other objects in view a feature of the present invention consists in the provision in a milling machine of the kind referred to, of a worktable support comprising an upstanding pillar carried by the machine base and functioning to receive vertical milling pressures.

Other features of the invention reside in means for vertically adjusting the pillar or a like support for the worktable and in guiding same in its movement; while further features reside in the construction, arrangement, and method of operation hereinafter more fully described and set forth in the appended claims.

For the purpose of more fully describing the nature of this invention reference will now be made to the accompanying drawing wherein.

Figure 1:
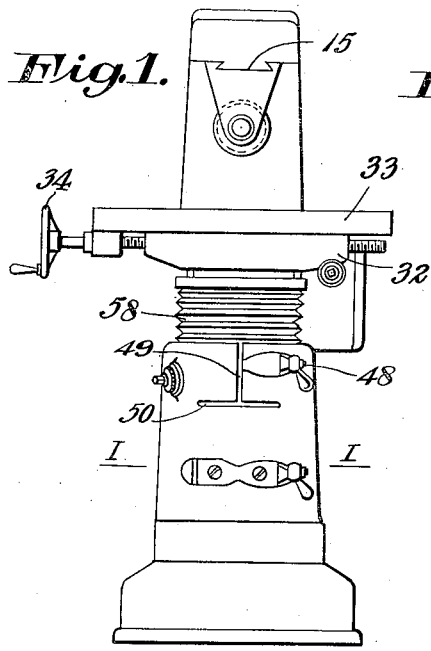
Fig. 1 is a front elevation of the milling machine according to the present invention.
Figure 2:
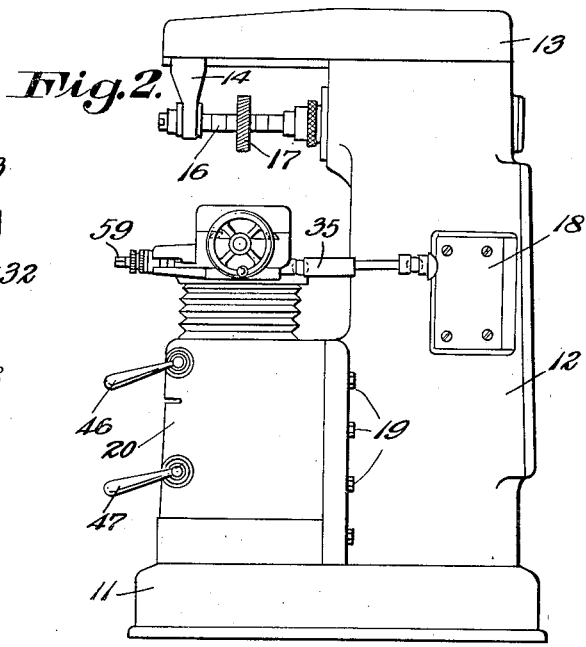
Fig. 2 shows this milling machine in side elevation.
Figure 3:
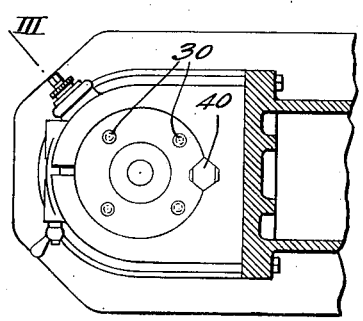
Figure 3 is a plan of the supporting device for the worktable, said worktable being assumed to have been removed.

In the embodiment of the invention illustrated, 11 is the base of the milling machine, to which is bolted the column 12. At the top of the column 12 is an overhanging arm 13 on which a bearing 14 is slidable in guideways 15. Situated in the interior of the column 12 are the driving and transmission gears for driving the arbor 16 on which is mounted the cutter 17. Mounted laterally on the column of the milling machine is a box 18 in which are accommodated the gearwheels for the table feed. Bolted to the front of the column 12 by the screws 19 is a hollow housing 20 which like the column 12 is mounted on the base 11. This housing constitutes a guide slidably accommodating therein a vertically adjustable pillar 21 of hollow cylindrical formation carried by a screwthreaded spindle 23 which is secured to said pillar at 22, and extends down the centre thereof.

Figure 5:
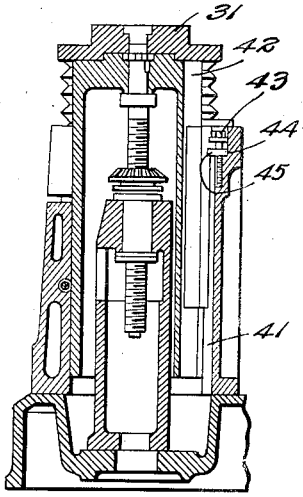
Fig. 5 is a vertical section on II—II of Fig. 4 through said supporting device.

The spindle 23 is supported by and projects into or through a screwthreaded bush 25 which is fast in a bevel gear 26, rotatably mounted in the head 27 of an inner pillar or upright 28. The inner pillar 28 is advantageously hollow and is bolted to a recessed plate 29 of the base 11. Secured by screws 30 to the head 24 of the slidable pillar 21 is the guideway 31, (Fig. 5), on which is guided in known manner the carriage 32, and on the latter in its turn the worktable 33. The carriage 32 is slidable on the guideway 31 at right-angles to the milling direction, while the worktable 33 is movable on the carriage 32 in the milling direction. The drive of this movement of the worktable 33 is effected in known manner either by means of the handwheel 34 or from the gearbox 18 through the shaft 35. Said shaft 35 is formed with a ball or other flexible joint, so that it can follow the vertical movements of the worktable.

Figure 6:
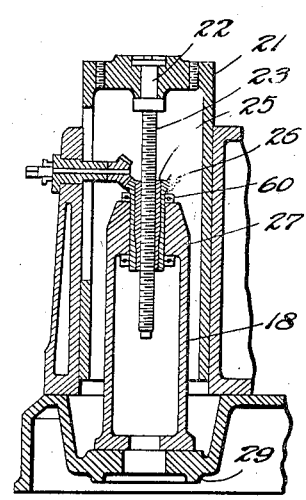
Fig. 6 is likewise a vertical section on III—III of Fig. 3 through said supporting device.
Figure 4:
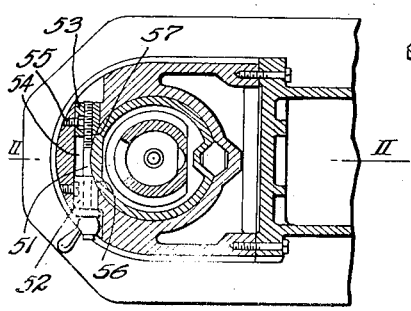
Fig. 4 is a horizontal cross-section on I—I of Fig. 1 through the supporting device for the worktable.

Fast in the pillar guide 20 is a bush 36 (Fig. 6) in which is rotatable a bolt 37 on which is adapted to be placed a crank or other turning member not shown. The bush 36 projects through a slot 38 of the adjustable pillar 21 into the interior of the latter, and the inner end of the bolt 37 has fixed thereon a small bevel gear 39 which is permanently meshed with the bevel gear 26.

In order to secure the pillar 21 against rotation in the guide 20, it is guided in its vertical movement by a strip 40. For this purpose, the pillar guide 20 and also the pillar 21 are provided with a groove 41 and 42 respectively. The guide strip 40 may have a square, rectangular, or other polygonal, or even circular cross-section. For holding the guide strip 40, there is in the pillar guide or housing 20 a screw 43 with a collar 44, and said collar 44 engages a notch 45 in the guide strip 40. The guide strip 40 is not firmly attached to the guide 20 of pillar 21, but it is suspended in the space formed by grooves 41 and 42, and torsions occurring on the pillar 21 in a tangential direction are supported on the outer groove 41 by means of the guide strip 40.

The handles 46 and 47 serve for fixing the pillar 21 in its adjusted vertical position. The handle 46 is mounted on a screw 48 screwed into the pillar guide 20. The pillar guide 20 is slotted in its upper part at 49 and 50 and can be contracted by turning the handle 46 so as to clamp or grip the pillar 21. The handle 47 is mounted on a screw 51 which passes loosely through a bush 52 and is screwed into a bush 53. The bushes 52 and 53 are slidable in a tangentially disposed bore 54 of the pillar guide 20, and are secured against rotation by the screws 55 which engage longitudinal grooves or slots. The two bushes 52 and 53 bear with the edges 56 and 57 against the periphery of the pillar 21. On turning the handle 47, which is supported on one bush 52, the two bushes 52 and 53 move towards each other, thereby pressing against the pillar 21, so that the latter is clamped.

For protection against chippings and dust, a leather or other flexible bellows 58, adapted to follow the vertical adjustment of the pillar 21 is arranged between the top of the pillar guide 20 and the carriage guideway 31.

The mode of operation of the new supporting device for the worktable is as follows:

After the clamping of the pillar guide 20 has been released by backward rotation of the handles 46 and 47, a crank is assembled on the bolt 37. By turning this crank, the gear wheel 39 meshing with the gear-wheel 26 is actuated. Said gear-wheel 26 rotates the screwthreaded bush 25 rigidly mounted in it, and hence the spindle 23 threaded through said bush is raised and lowered according to the direction of rotation of the crank. When the pillar 21 has been brought to the desired height, the handles 46 and 47 are again manipulated to clamp the pillar 21 tightly in the pillar guide 20.

The adjustment of the worktable carriage 32 by means of a crank placed on the bolt 59 and adjustment of the worktable 33 by means of the handwheel, is known per se and need not be described here.

The vertical pressures occurring during the milling of a workpiece clamped on the table 33 are, according to the invention, taken up by the pillar 21 and are transmitted to the spindle 23 and to the bevel gear 26, whence they are supported on the recessed plate 29 of the base 11 through the medium of a thrust ball bearing 60 and the inner pillar 28.

The horizontal milling pressures, on the contrary, are received by the pillar guide 20, and if they appear as tangential forces on the pillar 21, they are taken up by the guide strip 40 which is supported in the groove 41 against the pillar guide 20.

The slot 38 in the pillar 21 for the passage of the bush 36 may also be made wide enough for permitting partial rotation of the pillar. In order to make possible such partial rotation the guide strip 40 must be removed. Furthermore, the particular cross-section of the pillar 21 and its guide 20 is immaterial. In the constructional example shown in the drawing, this is circular, but it could equally well be of rectangular, square, or polygonal cross-section.

The use of a hollow cylinder as support and guide for the worktable has its advantages, and it will be appreciated that in such cylinder could be used the drive for the cross slide of the worktable. It is, however, conceivable that instead of a cylinder there may be employed three or more individual pillars arranged on a circle. In any case, however, the support for the worktable is vertically disposed immediately beneath the worktable.

We claim:

1. A supporting device for the worktable of a milling machine, comprising an upstanding pillar guide, a pillar slidable therein, means for moving the pillar in said guide, means for supporting said pillar on the base of the machine, two bushes slidable in the pillar wall, one of said bushes being internally screwthreaded while the other has a smooth bore, a bolt screwed into the screwthreaded bush and projecting through the smooth bore of the other bush, and a handle bearing on the second bush and adapted to rotate the bolt, draw both bushes towards one another and exert a grip on the periphery of the pillar.

2. In or for a milling machine a supporting device for the work-table comprising an upstanding stationary hollow pillar guide, a pillar vertically slidable therein, means for effecting vertical movement of said pillar in said guide, means for supporting said pillar and guide on the base of the machine, means for guiding the pillar in its vertical movement and preventing rotation of the same, consisting of a guide strip positioned in opposed grooves in said guide and said pillar, and a screw device for releasably retaining said strip in position.

3. A supporting device for the work-table of a milling machine comprising a hollow upstanding pillar guide, having a slotted wall, a pillar for carrying the work-table vertically slidable in said guide, means for effecting vertical movement of said pillar, means for positively contracting the slotted portion of said pillar guide to clamp said pillar against movement therein, and other means within said pillar guide also for clamping said pillar against movement in said guide.

4. A supporting device for the work-table of a milling machine comprising a hollow upstanding pillar guide, having a slotted wall, a pillar for carrying the work-table vertically slidable in said guide, means for effecting vertical movement of said pillar, means for positively contracting the slotted portion of said pillar guide to clamp said pillar against movement therein, and other means within said pillar guide also for clamping said pillar against movement in said guide, said two-pillar clamping means being positioned adjacent opposite ends of said guide.

REINHARD MAX WOHLFARTH.
PAUL ALFRED MITTER.